United States Patent
Di Martino

(10) Patent No.: US 11,070,444 B2
(45) Date of Patent: *Jul. 20, 2021

(54) SDN CONTROL PLANE PERFORMANCE TESTING

(71) Applicant: Nokia Technologies Oy, Espoo (FI)

(72) Inventor: Catello Di Martino, Plainfield, NJ (US)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/797,185

(22) Filed: Feb. 21, 2020

(65) Prior Publication Data

US 2020/0195519 A1 Jun. 18, 2020

Related U.S. Application Data

(63) Continuation of application No. 15/833,798, filed on Dec. 6, 2017, now Pat. No. 10,608,893.

(51) Int. Cl.
*H04L 12/24* (2006.01)
*H04L 12/26* (2006.01)

(52) U.S. Cl.
CPC .............. *H04L 41/24* (2013.01); *H04L 41/12* (2013.01); *H04L 41/145* (2013.01); *H04L 43/50* (2013.01)

(58) Field of Classification Search
CPC ....... H04L 41/145; H04L 41/12; H04L 43/50; H04L 41/24
See application file for complete search history.

(56) References Cited

U.S. PATENT DOCUMENTS

| | | | |
|---|---|---|---|
| 9,432,254 B1 * | 8/2016 | Naqvi | H04L 41/084 |
| 9,787,567 B1 | 10/2017 | Mehta et al. | |
| 10,484,285 B2 * | 11/2019 | Ulas | H04L 47/122 |
| 2014/0307556 A1 * | 10/2014 | Zhang | H04L 45/302 370/236 |
| 2015/0026667 A1 | 1/2015 | Pruss et al. | |
| 2016/0043941 A1 * | 2/2016 | D'Heureuse | H04L 41/00 370/390 |
| 2016/0080415 A1 * | 3/2016 | Wu | H04L 63/1491 726/23 |
| 2016/0294731 A1 | 10/2016 | McDaniel et al. | |
| 2017/0111230 A1 * | 4/2017 | Srinivasan | H04L 41/12 |
| 2017/0212864 A1 * | 7/2017 | Leitner | H04L 49/70 |
| 2018/0316729 A1 * | 11/2018 | Chauvet | G06F 9/50 |
| 2018/0337848 A1 * | 11/2018 | Bhaskar | H04L 12/6418 |

OTHER PUBLICATIONS

Di Martino, et al., "In Production Performance Testing of SDN Control Plane for Telecom Operators," 2018 48th Annual IEEE/IFIP International Conference on Dependable Systems and Networks (DSN), Luxembourg City, Jun. 25-28, 2018, 12 Pages.
International Search Report and Written Opinion mailed in corresponding PCT/US2018/062528 dated Feb. 14, 2019, 14 pages.

\* cited by examiner

*Primary Examiner* — Abdullahi E Salad
(74) *Attorney, Agent, or Firm* — Tong, Rea, Bentley & Kim, LLC

(57) ABSTRACT

The present disclosure generally discloses a performance testing capability configured for performance testing in communication networks. The performance testing capability may be configured to support in-production performance testing in communication networks. The performance testing capability may be configured to support in-production performance testing in Software Defined Networking (SDN) based communication networks.

20 Claims, 10 Drawing Sheets

FIG. 2

EXPERIMENTAL CAMPAIGN SPECIFICATION
200 experiments:

\- id: 5Medium_1000
runs: 10
deploy: "five_controller_deploy"
duration: 5
warmup: 2000
intentTraffic: 1kb
networkTopologyInfo:
  topologyType: linear
  switches: 10
  hosts: 10
  links: 18
loadGenerationInfo:
  batchsize: 1000
  requestPerTask: 10

FIRST EXPERIMENTAL CAMPAIGN

\- id: 3Large_3000
runs: 10
deploy: :three_controller_deploy"
duration: 5
warmup: 2000
intentTraffic: 1kb
networkTopologyInfo:
  topologyType: real
  switches: 16
  hosts: 30
  links: 30
loadGenerationInfo:
  batchsize: 3000
  requestPerTask: 30

SECOND EXPERIMENTAL CAMPAIGN

FIG. 3

COLLECTED DATA SETS
300

| Controller-level Data 301 | JVM/host level Data 302 |
|---|---|
| • Cluster events<br>• Cluster consistency data<br>• Topology events<br>• Flow rule events<br>• Intent events | • CPU usage<br>• Memory usage<br>• Thread count<br>• JVM memory |
| System-level Data 303 | Network-level Data 304 |
| • System log (guest OS)<br>• Karaf event<br>• Controller logs<br>• VM orchestration logs<br>• Workload logs | • Device resource utilization<br>• Device events<br>• Flow rule statistics<br>• PCAP packet dump<br>• Port-level statistics |

FIG. 5

ALGORITHM
500

| Algorithm | Topology Generation |
|---|---|

Input: networkUnderTest nut, campaignManager CM, LoadGenerator LG
1: hosts = nut.getAllHosts(nut)
2: clusterMembers = nut.getControllers(nut)
3: links = nut.getLinks (nut);
4: devices = nut.getDevices(nut);
5: testingCluster = CM.cloneAndDeployInstances(clusterMembers);
6: testTopology=cloneTopology(hosts,devices,links,clusterMembers);
7: programTopologyControllers(testTopology.getIPs());
8: LG.initTopology(testTopology,testingCluster,nut.getIntents());

*FIG. 6*

ALGORITHM
600

| Algorithm   Load Generation Startup – Production Mode |
|---|
| Input: networkUnderTest nut, campaignManager CM, LoadGenerator LG, Experiment Manager EM
1: testingResourcesInstances = CM.getTestingInstances(nut, LG));
2: productionCtrlPlaneSW = CM.getCtrlSW(nut);
3: testVLAN = CM.getNewVLAN();
4: LGSwitchPort = CM.assignSwitch(CM.createNIC(LG), productionCtrlPlaneSW);
5: CM.setVLAN(LGSwitchPort, testVLAN);
6: LGCtrlPlaneTestSW = CM.createNewSwitch();
7: for all instance in CM.getProductionInstances(nut) do
8:     LGTestNIC = CM.createNIC(LG, instance.getCtrlNic());
9:     CM.assignSwitch(LGTestNIC, productionCtrlPlaneSW, TestVLAN);
10: end for
11: for all VM in testingResourcesInstances do
12:     VMCtrlPlaneTestNic = CM.createNIC(VM);
13:     CM.assignSwitch(VMCtrlPlaneTestNic, LGCtrlPlaneTestSW, TestVLAN);
14: end for
15: InstancesPorts = CM.getProductionInstancesPorts(nut, productionCtrlPlaneSW);
16: for all port in productionInstancesPorts do
17:     CM.mirror(port, LGSwitchPort);
18: end for
19: Em.programInstances(testingResourceInstances); |

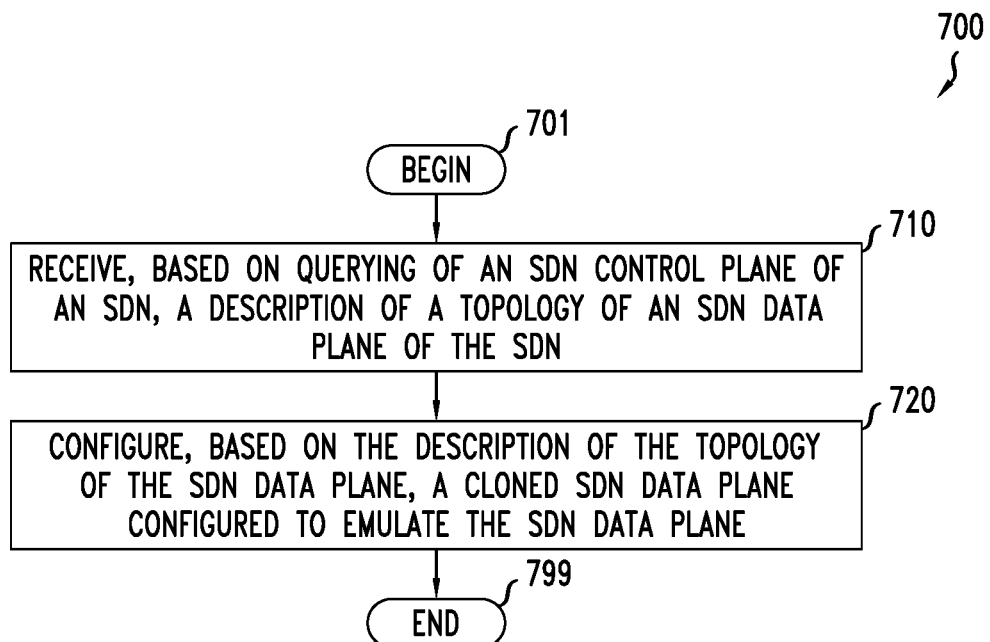

SDN CONTROL PLANE PERFORMANCE TESTING

CROSS-REFERENCE TO RELATED APPLICATIONS

This application is a continuation of U.S. patent application Ser. No. 15/833,798, filed on Dec. 6, 2017, entitled SDN CONTROL PLANE PERFORMANCE TESTING, which is hereby incorporated herein by reference.

TECHNICAL FIELD

The present disclosure relates generally to communication systems and, more particularly but not exclusively, to performance testing in virtualized communication systems.

BACKGROUND

In telco world, telco operators continue to push for disaggregating, realigning, and re-integrating network functions, elements, and systems, in order to meet various evolving market demands, changing network conditions, and unpredictable traffic patterns in short innovation cycles. Under this push, the telco industry looks with interest at the possibility at adopting and converging newer technologies such as Software Defined Networking (SDN) as well as other technologies (e.g., network function virtualization (NFV) and the like) to achieve a truly programmable network fabric for addressing future communication needs. While such cloudification and softwarization of the network promises to offer a range of new services, an unparalleled level of automation, and unique flexibility, it also presents significant challenges. Cloud services can be instantiated in a matter of seconds, yet the capability to rapidly schedule, test, and allocate physical network resources for operators is often many times slower. Most of the deployment time is spent in manually (or close to manually) tuning the different "knobs" in the control plane (e.g., in the SDN and telco cloud) and running tests to actually guarantee that the network is able to meet specific levels of service (e.g., latency, throughput, or the like). To further complicate things, in the near future operators likely will have to address the need for massive increases in control plane capacity to handle Machine-to-Machine (M2M) streams from Internet-of-Things (IoT) devices, which are expected to grow significantly in the future. For instance, IoT devices generate a substantially higher volume of signaling traffic relative to data traffic, which will significantly increase the load on the control plane. While configuration of network devices can be simplified by using network abstractions and SDN platforms, solutions for performance testing of SDNs are needed.

SUMMARY

The present disclosure generally discloses performance testing capabilities configured for in-production performance testing in virtualized communication networks.

In at least some embodiments, an apparatus is provided. The apparatus is configured to support in-production performance testing. The apparatus includes a processor and a memory communicatively connected to the processor. The processor is configured to support testing of an SDN including an SDN data plane and an SDN control plane. The processor is configured to receive, based on querying of the SDN control plane, a description of a topology of the SDN data plane. The processor is configured to configure, based on the description of the topology of the SDN data plane, a cloned SDN data plane configured to emulate the SDN data plane. In at least some embodiments, a non-transitory computer-readable storage medium stores instructions which, when executed by a computer, cause the computer to perform a corresponding method for supporting in-production performance testing. In at least some embodiments, a corresponding method for supporting in-production performance testing is provided.

In at least some embodiments, an apparatus is provided. The apparatus is configured to support in-production performance testing. The apparatus includes a processor and a memory communicatively connected to the processor. The processor is configured to support testing of an SDN including an SDN data plane and an SDN control plane. The processor is configured to receive, from a control plane switch, a mirrored service request associated with a service request associated with the SDN. The processor is configured to send the mirrored service request toward a cloned SDN controller configured to emulate an SDN controller of the SDN control plane. In at least some embodiments, a non-transitory computer-readable storage medium stores instructions which, when executed by a computer, cause the computer to perform a corresponding method for supporting in-production performance testing. In at least some embodiments, a corresponding method for supporting in-production performance testing is provided.

In at least some embodiments, an apparatus is provided. The apparatus is configured to support in-production performance testing. The apparatus includes a processor and a memory communicatively connected to the processor. The processor is configured to receive a service request for a service associated with an SDN including an SDN controller and an SDN data plane. The processor is configured to send the service request toward the SDN controller of the SDN and toward a set of testing resources supporting a cloned SDN configured to emulate the SDN. In at least some embodiments, a non-transitory computer-readable storage medium stores instructions which, when executed by a computer, cause the computer to perform a corresponding method for supporting in-production performance testing. In at least some embodiments, a corresponding method for supporting in-production performance testing is provided.

BRIEF DESCRIPTION OF THE DRAWINGS

The teachings herein can be readily understood by considering the following detailed description in conjunction with the accompanying drawings, in which:

FIG. 2 depicts an example of an experimental campaign specification including analysis parameters for an experimental campaign which may be performed for testing an SDN control plane;

FIG. 3 depicts an example of data sets collected during and after an experimental campaign which may be performed for testing an SDN control plane;

FIG. 5 depicts an example of an algorithm for use by a Topology Manager of the in-production performance testing system architecture to provide an emulated version of a production SDN;

FIG. 6 depicts an example of an algorithm for use by a Load Generator of the in-production performance testing system architecture to apply load to an emulated version of a production SDN;

FIG. 7 depicts an example of a method for use by a Topology Manager of the in-production performance testing system architecture to provide an emulated version of a production SDN;

To facilitate understanding, identical reference numerals have been used, where possible, to designate identical elements that are common to the figures.

DETAILED DESCRIPTION

Figure 1:
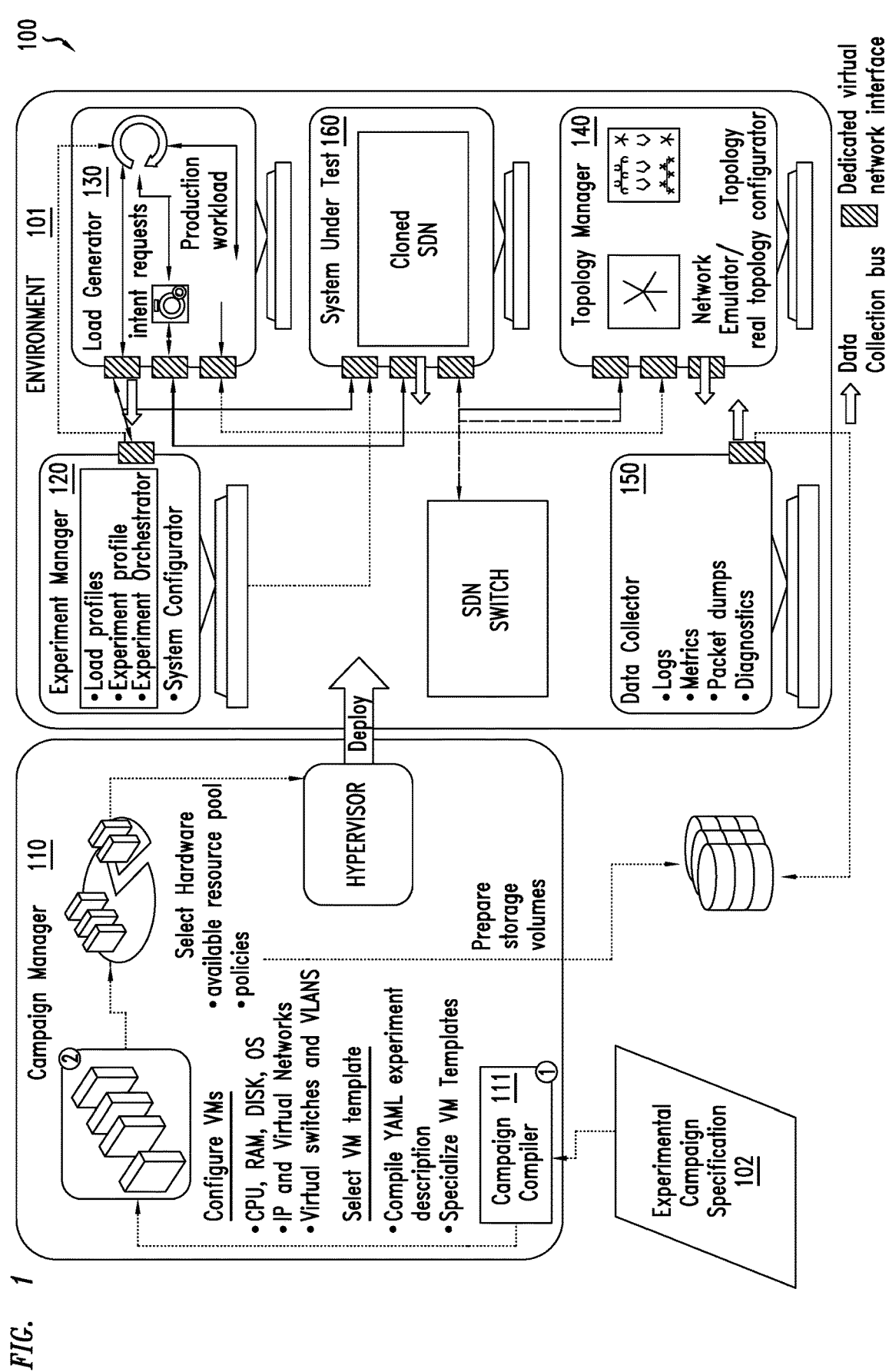
FIG. 1 depicts an in-production performance testing system architecture configured to support in-production performance testing for Software Defined Networks (SDNs)

The present disclosure generally discloses a performance testing capability configured for in-production performance testing in communication networks. The performance testing capability may be configured to support in-production performance testing in Software Defined Networking (SDN) based communication networks (which typically are referred to as Software Defined Networks (SDNs)). The performance testing capability may be configured to support in-production performance testing of an SDN control plane of an SDN. In various embodiments of the performance testing capability, an in-production cloud-based network under testing is cloned and virtualized at production time into a set of testing resources (e.g., virtual machines) to form thereby a virtualized in-production network (system under test) and the virtualized in-production network is used for executing tests (e.g., tests configured to identify optimal runtime network configuration parameters, identify performance bottlenecks, or the like, as well as various combinations thereof), thereby enabling in-production performance testing of the in-production cloud-based network using the virtualized in-production network as a proxy for the in-production cloud-based network. In various embodiments of the performance testing capability, a Campaign Manager clones the SDN controller and SDN controller state of the in-production cloud-based network into the set of testing resources, a Topology Manager virtualizes the topology of the in-production cloud-based network into an emulator executing an emulated version of the in-production cloud-based network, and a Load Generator receives mirrored workload requests of the in-production cloud-based network (e.g., from a virtual switch or network configured to support mirroring of production workload requests to both the in-production cloud-based network and the Load Generator) and provides the mirrored workload requests to the emulator executing the emulated version of the in-production cloud-based network (and also may generate synthetic requests and provide the synthetic requests to the emulator executing the emulated version of the in-production cloud-based network based on merging of the workload requests and the synthetic requests), thereby enabling in-production performance testing of the in-production cloud-based network using the virtualized in-production network as a proxy for the in-production cloud-based network. It will be appreciated that these and various other embodiments and advantages or potential advantages of the performance testing capability may be further understood by way of reference to the drawings and the following description.

One of the biggest challenges for many telco operators is to optimize the network in ways to enable the creation of new services on the spot while still being able to run the network at its optimal performance/revenue break point. To this end, many telco operators are moving to a much leaner cloud-based SDN infrastructure to achieve a truly programmable network fabric. While cloud services can be provisioned in seconds and tested in-production, SDN still requires substantial manual effort, mostly devoted to testing and tuning the control plane.

In telco world, telco operators continue to push for disaggregating, realigning, and re-integrating network functions, network elements, and systems, in order to meet various evolving market demands, changing network conditions, and unpredictable traffic patterns in short innovation cycles. Under this push, the telco industry looks with interest at the possibility of adopting and converging newer technologies such as SDN as well as other technologies (e.g., network function virtualization (NFV), new wireless networking technologies such as Fifth Generation (5G) wireless network technologies, and the like) to achieve a truly programmable network fabric for addressing future communication needs. For instance, Telco Cloud is meant to provide a dedicated cloud computing solution for network operators, shifting network functions from dedicated legacy hardware platforms into virtualized software components, deployable on general-purpose hardware in order to deliver agile, elastic, and highly-personalized services.

While the cloudification and softwarization of the network promise to offer a range of new services, an unparalleled level of automation, and unique flexibility, it also presents significant challenges. Cloud services can be instantiated in a matter of seconds, yet the capability to rapidly schedule, test, and allocate physical network resources for operators is often many times slower (e.g., potential more than 100 times slower and, thus, taking days if not weeks). Most of the deployment time is spent in manually (or close to manually) tuning the different "knobs" in the control plane (e.g., in the SDN and telco cloud) and running tests to actually guarantee that the network is able to meet specific levels of service (e.g., latency, throughput, or the like). To further complicate things, in the near future operators likely will have to address the need for massive increases in control plane capacity to handle Machine-to-Machine (M2M) streams from Internet-of-Things (IoT) devices, which are expected to grow significantly in the future. For instance, IoT devices generate a substantially higher volume of signaling traffic relative to data traffic, which will significantly increase the load on the control plane. For example, it has been estimated that a typical IoT device may need up to 2,500 transactions or connections in order to consume 1 MB of data. In order to seize this opportunity, operators will have to adopt leaner approaches to test and run their networks "hotter" and closer to the optimal revenue point. Such increases in control plane traffic, if not handled properly, may cause control plane bottlenecks which, it will be understood, can lead to major system outages, network device unavailability, under-utilization of network capacity, or the like. While the configuration of network devices can be simplified by using network abstractions (e.g., netgraph, Yang models, or the like) and SDN controller platforms, solutions for automating performance testing of SDNs are needed.

It is noted that at least some of these challenges may be addressed by various embodiments of an in-production performance testing platform. The in-production performance testing platform may be configured to provide an in-production performance testing framework for SDNs in telco cloud deployments. The in-production performance testing platform may be configured to provide automation in the performance analysis of the SDN control plane. The in-production performance testing platform may be configured to provide automation in the performance analysis of the SDN control plane based on use of idle cycles of the telco cloud infrastructure. The in-production performance testing may be configured to focus on an analysis of how design choices in the cloud and SDN control planes influence service level agreement (SLA) metrics such as service installation throughput, latency, or the like. The in-production performance testing platform may be configured to provide a level of automation in performance testing of different network configuration of SDNs that is similar to, or even exceeds, the level of automation currently available in deploying cloud services. The in-production performance testing platform, as discussed further below, may be configured to support various other functions, provide various other benefits, or the like, as well as various combinations thereof.

The in-production performance testing platform may be configured to provide an in-production performance testing framework for SDNs in telco cloud deployments. The in-production performance testing platform may be configured to automate the performance testing of the SDN control plane in a telco-cloud environment. SCP cloud can reduce testing-related and knob-setting costs by a factor of 10, i.e., days versus weeks. The in-production performance testing may focus on analysis of how the design choices in the cloud and SDN control planes influence latency and throughput at user level (in the data plane). The in-production performance testing platform may be configured to guarantee control-plane performance without necessarily requiring careful system-level tuning. The in-production performance testing platform may be configured to provide an in-production performance testing framework for SDNs in telco cloud deployments by building on various principles which are discussed below.

The in-production performance testing platform may be configured such that performance testing of control plane is be carried out during production hours, using idle cycles of the telco cloud, in order to discover configuration/load-specific bottlenecks. The in-production performance testing platform may be configured to create testing resources on-demand (e.g., virtual machines (VMs), virtual networks, virtual data stores, or the like), replicating the production configuration into a controlled environment (referred to herein as a test plane) without disrupting the production workload. The in-production performance testing platform includes a cloud orchestrator configured to automate the life cycle of the testing resources over preemptive cloud nodes (e.g., any idle nodes in the continuum from the edge cloud to the core network cloud), enable parallel experiments and out-of-band data collection while running the tests, or the like.

The in-production performance testing platform may be configured such that tests may be run in production/representative workload conditions. Differently from other benchmarking work and tools, in-production performance testing may be carried out using a black-box approach (e.g., using application programming interfaces (APIs) normally visible at the NFV/application layer, without assumptions on the internals of the underlying SDN control platform). This allows the in-production performance testing platform to feed the system under test with the requests coming from the production network. This may be achieved by mirroring part of the production control plane workload towards the test plane created on demand to run the testing tasks. The mirroring may be managed by a Load Generator of the in-production performance testing platform. Production workload can be augmented with synthetic requests generated by the Load Generator in order to test the control plane against specific workload profiles (e.g., overload conditions). Data collected from experiments can be used to extract actionable intelligence, for instance, to decide whether to scale up or down the VMs managing the SDN control network.

The in-production performance testing platform is primarily presented herein as being implemented based on the ONOS open source controller and intent-based networking; however, it will be appreciated that the in-production performance testing platform may be implemented based on other types of controllers, based on other types of networking, or the like, as well as various combinations thereof.

The in-production performance testing platform may be configured to provide an in-production performance testing framework for SDNs in telco cloud deployments. SDN has emerged in the very last few years as a paradigm capable of providing new ways to design, build, and operate networks. This is due to the key concept of separating the network control logic (i.e., the control plane) from the underlying equipment (i.e., switches—referred to as network devices) that forward and transport the traffic over the data plane. The logical entity hosting SDN services in the control plane is typically referred as SDN controller. Recently, the concept of controller has evolved to that of network operating system (NOS), an operating system—which can possibly run on commodity hardware—specifically providing an execution environment for network management applications, through programmable network functions. In the logical SDN architecture, the controller is (1) below the application layer that interact with it through the northbound interface (NBI) and (2) above the network devices implementing the data plane, managed through the southbound interface (SBI). The separation of the planes is implemented through well-defined APIs tailored to manage network resources (through the SBI) after receiving requests coming from NFV and network applications (through the NBI). Examples of SDN controllers/NOSs include NOX, Beacon, ODL, ONOS, and others. Examples of APIs include OpenFlow (which is configured to program flows into SDN-enabled network elements such as SDN switches), Open Network Environment, and others. Many network OSs are implemented as a set of use cases (e.g., ODL) and bundles (e.g., ONOS) on top of APACHE Karaf 2, a JAVA Open Service Gateway Initiative (OSGi) container providing a modular run-time environment. It will be appreciated that the SDN controllers/NOSs and APIs may be implemented in various other ways.

The in-production performance testing platform may be used with distributed NOSs. In general, SDN architecture applies top-down logically-centralized network control. Some controllers enrich this architecture by making it distributed. In SDN, the general idea typically is to form a cluster of controller instances, each in charge of a subsection of the network. The state information local to a subsection is disseminated across the cluster by the node that manages the subsection through the so-called eastbound and westbound interfaces. The events are generated locally and shared with all of the other instances via distributed mechanisms in order to form a uniform global view of the network. The various instances make up the network OS distributed core, providing applications with a centralized logical view of the network. The presence of cooperating instances is transparent to applications atop, as well as to switches in the data plane. Each device may have one master and multiple backup instances. It is noted that, depending on the requirements of a service, how the contents of a store are distributed between the nodes can have different characteristics (e.g., strongly or eventually consistent). It is further noted that consistency mechanisms clearly influence performance when scaling out controllers.

The in-production performance testing platform may be used with distributed NOSs configured based on use of network intents. The basic techniques to program SDN switches often rely on OpenFlow, which allows programming of flows in order to put egress and output ports in communication to finally create a network path. Complex network topologies with different disjoint paths available require the selection of the proper ports in order to realize an end-to-end flow of data between two hosts. To simplify the creation and management of flows in complex networks, modern network operating systems, like ODL and ONOS, provide a higher-level abstraction of the SDN flows, called intent, i.e., declaration of service requests (e.g., connection from New York to Los Angeles, with specific quality of service, to be used for a given amount of time) that are compiled by the NOS in order to identify the set of network resources to be programmed and monitored in order to provision the service (the intent).

The in-production performance testing platform, as noted above, may be used with distributed NOSs configured based on use of network intents. The lifecycle of an intent in the ONOS operating system has a number of stages or states (e.g., Submitted, Compiling, Installing, Installed, Recompiling, Failed, Withdrawing, and Withdrawn). In general, applications request intents through the NBI in the form of policy statements or connectivity requests. An example of such a request may be: set up a connection between hosts A and B. The requests may be accumulated in a batch (which may have a default max size, such as 500 request, 1,000 requests or the like), in order to reduce processing overhead. A batch of requests may be processed either when it reaches its maximum size or after a specified timeout (e.g., after 50 ms, 100 ms, or the like). When compiling a batch of intents (Compiling stage), ONOS identifies a bidirectional shortest path connecting the hosts. Then, the path is compiled in sets of flow rules to install through the SBI on each device in the chosen path. For example, in a linear topology with 10 switches, a path between two hosts connected to the edge switches may be compiled in 10 sets of 2 flow rules per device, 10 rules for each direction of the bidirectional path. Intents can be recompiled (Recompiling stage) after a topology change. An intent is failed (Failed stage) when ONOS cannot find a path for the intent (e.g., due to a network partition). Failed intents may be attempted to be recompiled periodically. Finally, an installed intent can be removed from the data plane when a withdraw requests is received from the NBI (Withdrawing and Withdrawn stages). The requestor is notified of the result of the request (e.g., installed or withdrawn) through a call back from the NBI.

FIG. 1 depicts an in-production performance testing system architecture configured to support in-production performance testing for SDNs.

The in-production performance testing system architecture 100 provides a platform that supports automation of performance testing in telco-cloud environment, including automating the creation, running, and analysis of performance tests for SDN control planes.

The in-production performance testing system architecture 100 includes am environment 101 and a Campaign Manager 110. The environment 101 includes an Experiment Manager 120, a Load Generator 130, a Topology Manager 140, a Data Collector 150, and a System Under Test 160. These components of the in-production performance testing system architecture 100 interact and cooperate with an underlying cloud infrastructure-as-service (IaaS) platform in order to configure, deploy, and test a distributed SDN infrastructure in the telco cloud space on demand, with the following features.

The in-production performance testing system architecture 100 is configured to support an automated lifecycle of testing resources.

The Campaign Manager 110 may be configured to orchestrate a set of one or more experimental campaigns based on an experimental campaign specification 102. The experimental campaign specification 102 includes, for each of the one or more experimental campaigns to be performed for the System Under Test 160, a description of the experimental campaign to be performed for the System Under Test 160, respectively. The experimental campaign specification 102 may include, for each of the one or more experimental campaigns to be performed for the System Under Test 160, a respective set of experiment-related parameters for the respective experimental campaign. The set of experiment-related parameters for an experimental campaign may include parameters specifying the numbers and types of VMs to deploy, the type of SDN controller to deploy, network topology information, or the like, as well as various combinations thereof. The experimental campaign specification 102 may be specified by a user, by a user system on behalf of a user (e.g., based on one or more of user input, detection of a condition, or the like, as well as various combinations thereof). An example of an experimental campaign specification 102 is presented in FIG. 2. The Campaign Manager 110 includes a Campaign Compiler 111 that is configured to receive the experimental campaign specification 102 and to compile the experimental campaign specification 102 (e.g., to compile the respective sets of experiment-related parameters for the respective experimental campaigns to provide respective sets of commands associated with the respective experimental campaigns) to provide various types of commands to various components (e.g., to provide cloud infrastructure commands to the Campaign Manager 110, to provide commands to program the components needed to perform the experiments to the Experiment Manager 120, or the like, as well as various combinations thereof).

The Campaign Manager 110 may be configured to perform the following actions: (1) set up the cloud by interacting with the underlying IaaS platform to configure and deploy the testing resource VMs (e.g., the SDN controller(s), the network emulator VM(s), the Experiment Manager 120, the Load Generator 130, the Topology Manager 140, the Data Collector 150, and the like), using a pool of resources designated for the testing activities (e.g., idle cloud nodes), (2) create and configure the virtual switches in the cloud infrastructure (e.g., IPs, VLANS, and port groups over virtual switches and so forth) in order to interconnect the created testing resources, (3) set up and configure the various data stores to host and execute the user experiment and collect metrics of interest, and (4) compile the experimental campaign specification 102 in order to provide parameters to components in the workflow (e.g., Campaign Manager 110, Experiment Manager 120, or the like). The Campaign Manager 110 may be implemented in a system agnostic manner. For example, the Campaign Manager 110 may be implemented such that its REST APIs support common operations across different IaaS platforms (e.g., VM creation, virtual network deploy, or the like). The Campaign Manager 110 may be implemented such that the actual mapping of the operations of the Campaign Manager 110 to platform-specific APIs calls is implemented by specific cloud drivers written in Yet Another Markup Language (YAML). Once the testing resource VMs are deployed by the Campaign Manager 110, the control is given to the Experiment Manager 120 to manage the lifecycle of the testing resources.

The Experiment Manager 120 may be configured to manage the lifecycle of the testing resources deployed by the Campaign Manager 110. The Experiment Manager 120 may be configured to manage the lifecycle of the testing resources using three steps, or phases, referred to as a start-up phase, a testing phase, and a cleanup phase.

In the startup phase, the Experiment Manager 120 may configure the entities in the cloud infrastructure according to the experimental campaign specification 102. Configured resources may include controller instances, monitoring and data collection services, topology, workload generation services, or the like. The SDN controller instances may be installed and configured starting from pre-loaded VM templates provided by the Campaign Manager 110. A template may be a generic installation of a specific controller (e.g., ONOS, ODL, or the like) over a lightweight Linux VM, that may be customized by the Experiment Manager 120 depending on the experimental campaign specification 102 (e.g., VM size and number of SDN instances) and deploy type (e.g., IP and VLAN mirroring the production control plane network). The Experiment Manager 120, after customizing the templates, waits until the SDN controllers are correctly brought up. Then, the Experiment Manager 120 interacts with the Topology Manager 140 to configure the data plane topology that will be used for running the test, as discussed further below. The Experiment Manager 120 then checks that the controller instances correctly discovered the dataplane topology and forces the balancing of the mastership of the devices between the deployed controllers. By doing so, the Experiment Manager 120 may ensure that each instance is defined as master of at least one device, and as a backup controller for at least one other device. The Experiment Manager 120, once the activation of all the VMs is terminated, configures the Data Collector VM to provide the Data Collector 150 and launches the Load Generator boot procedure of the Load Generator 130. Depending on the experimental campaign specification 102, this procedure configures the IaaS virtual network resources in order to mirror the control plane requests issued by the SDN applications and NFV (e.g., intent installation and removal request) towards the newly created Load Generator VM. The mirrored control plane traffic is used by the Load Generator 130 to exercise the system under test. In addition, depending on the experimental campaign specification 102, the Load Generator 130 can create additional synthetic control plane requests and request profiles that are injected into the mirrored traffic to test the system against different scenarios. At the end of the start-up operations, the Experiment Manager 120 takes snapshots of the created VMs in order to speed up the creation of experiments with the same configuration (e.g., in case multiple repetition of the same experiments are needed). If any of the described operations fail, the Experiment Manager 130 cleans up the SDN controller VMs and repeats (e.g., for a predefined number of times) the start-up phase (potentially from the beginning or from an intermediate point).

In the testing phase, the Experiment Manager 120 starts the Data Collection daemons (e.g., host and controller daemons) of the Data Collector 150 on the controller instances and commands the Load Generator 130 to start loading the SDN instances with the generated/mirrored requests. For each experiment, the Experiment Manager 120 generates a unique experiment ID and programs the duration of the experiment that, depending on the experimental campaign specification 102, can be fixed (e.g., 10 min, 30 min, or the like) or can depend on the Load Generator 130 and on the number of requests to process in the test. In the clean-up phase, the Experiment Manager 120 performs clean-up of the experiment performed in the testing phase. The Experiment Manager 120 may perform cleanup of an experiment by reverting the VMs to the snapshot taken during the startup phase, in order to repeat the experiment under the same configuration. Thus, where multiple experiments are performed by the Experiment Manager 120, as illustrated in FIG. 1, for each experiment the testing phase may be followed by a corresponding clean-up phase, such that the Experiment Manager 120 may cycle between the testing and clean-up phases for the experiments being performed, respectively. In the clean-up phase, the Experiment Manager 120 also performs further clean-up operations which are executed when no additional experiments are to be performed, such as stopping all of the testing resource VMs, invoking the Campaign Manager 110 to remove any allocated resources (e.g., VLANS and virtual switches created by the Load Generator 130), or the like.

The in-production performance testing system architecture 100 is configured to support experiment triggers and user interaction. In general, in-production performance testing experiments can be triggered in two ways: on-predicate and on-demand. The on-predicate mode involves programming the in-production performance testing system 100 to start the analysis when specific conditions are met. These conditions can be programmed by the user in specific scripts interacting with the APIs of the in-production performance testing system architecture 100 to program the experiments. For instance, a user can program to start the experiment when a new increasing trend in the number of intent installation requests is observed, in order to test whether the control plane has enough capacity or needs to be scaled up if the load reached higher levels. The on-demand mode involves manually starting the analysis. In both cases, the user may specify the analysis parameters (e.g., what to analyze, what scenarios to reproduce, and so forth) in the experimental campaign specification 102. As noted above, an example of an experimental campaign specification 102 for two experimental campaigns (denoted as "5Medium_1000" and "3Large_3000") based on use of YAML is presented in FIG. 2 as experimental campaign specification 200. The experimental campaign specification 200 includes, for each of the two experimental campaigns, a set of YAML tags describing deployment options, workload options, and so forth. The tags of the experimental campaign specification 200 may be compiled by the Campaign Compiler 111 of the Campaign Manager 110 into various types of commands for various components. For example, the tags of the experimental campaign specification 200 may be compiled by the Campaign Compiler 111 of the Campaign Manager 110 into cloud infrastructure specific commands (e.g., VMWare ESXI over VCloud and OpenStack), to allocate, deploy and orchestrate the VMs, virtual networks and data stores accordingly. For example, the tags of the experimental campaign specification 200 may be compiled by the Campaign Compiler 111 of the Campaign Manager 110 into a set of commands for the Experiment Manager 120 to program the components needed to perform the experiments (e.g., a Workload Manager). The operations performed by the Campaign Manager 110 are logged in a specific log file that includes info on the type(s) of cloud resources used in the experiment and the time of creation and destroy of the cloud resources used in the experiment. The deployment specifications may be defined by means of bash snippets (the "deploy" parameter in the experimental campaign specification 200) including information related to the VMs to deploy, such as VM size, VM type, instances, and servers. The VM size and VM type specify the size and type of the VMs, respectively, while instances defines the number of VMs to deploy for each type (e.g., to test different replication schemes), and servers indicates the cloud partition (e.g., two availability zones, four availability zones, or the like) in the cloud computing infrastructure where to execute the VMs. It will be appreciated that the deployment specification may include less or more information including other types of information. It will be appreciated that experimental campaign specification 200 may include less or more information including other types of information, may be organized in different ways, or the like, as well as various combinations thereof.

The in-production performance testing system architecture 100 is configured to support data collection. At the conclusion of the each of the experimental campaigns, data is collected and presented to the user in the form of high-level reports and an experiment dump which may include several performance, system, software, and diagnostic logs generated during the execution of the experiments, respectively. The Data Collector 150 collects all the data generated by all the instances composing the System Under Test 160, and stores experimental data (in the form of raw logs, compound metrics, and high-level summary reports) in a centralized data store setup by the Campaign Manager 110, for subsequent review, visualization, and analysis. Data is gathered from a number of sources (e.g., VMs and SDN controller logs, workload metrics, resource usage metrics, various diagnostic logs, or the like) after each experimental campaign in order to eliminate any additional monitoring overhead in the System Under Test 160. Data may be collected out of band through a specific data bus hosted over a dedicated management network. An example of data sets collected during and after each of the experimental campaigns is presented in FIG. 3. The collected data sets 300 include controller-level data 301, JVM/host level data 302, system-level data 303, and network-level data 304. It will be appreciated that less or more data, including other types of data, may be collected as part of collected data 300. The data collected by the Data Collector 150 may be periodically sent to a Monitoring Server, running in a separate VM. The Monitoring Server may use the no-sql InfluxDB3 as an event storage engine, while raw logs and system dumps may be stored in data store setup by the Campaign Manager 110. The Data Collector 150 may run Grafana platform 4 to plot the events generated during each experimental campaign. The Data Collector 150 also may collect additional data for the set of experimental campaigns as a whole.

The in-production performance testing system architecture 100 is configured to support metrics. The main metrics measured by the in-production performance testing system architecture 100 may include (1) intent installation/withdrawal throughput (referred as throughput) computed as the number of intent requests correctly provisioned per second, (2) intent installation/withdrawal latency (referred as latency), computed as the difference between the time the intent installation or removal request is accepted by the system (Request command in FIG. 1) and the time the operation is terminated and result communicated to the requester (Request executed in FIG. 1), (3) and capacity, defined as the maximum rate of intent installation/withdrawal that the system can withstand while keeping a given rate of successful installed intent. These metrics may be computed by parsing the request responses received by the Load Generator 130. Samples are collected in bins as large as the unit of time specified in the experimental campaign specification 102 (i.e., seconds, minutes or hours). Mean, standard deviation, percentiles, and confidence intervals are estimated for each bin, and, if specified in the experimental campaign specification 102, across different repetition of the same experiment (e.g., in case of synthetic or trace-driven workload). It will be appreciated that the above-described metrics may be defined and collected in other ways. It will be appreciated that other metrics may be collected.

The in-production performance testing system architecture 100 is configured to support system diagnostics and test pass/fail criteria. In order to validate the correctness of the performed tests, the in-production performance testing system architecture 100—performs detailed checks to detect whether the tests performed as expected. To this end, the Data Collector 150 collects the error codes generated by the cloud platform (e.g., VMs preempted/suspended by the cloud platform, no storage left in the data store, or the like), exceptions generated by the testing resources VMs including exceptions in the SDN controller(s), or the like, as well as various combinations thereof. Concerning the latter, the Campaign Manager 110 may execute the following checks: (1) ping of all the VMs, (2) SDN controller IPs and IDs, (3) network configuration of all the SDN controller interfaces, (4) ID of the devices, links and hosts correctly installed in the SDN controller, (5) topology (device and host connectivity), (6) software modules correctly loaded (e.g., Karaf Bundles or Java Classes), (7) state of the SDN controllers in the same cluster (if applicable), (8) space left on the allocated data store, and (9) exceptions reported in the logs of each VMs. Those checks may be performed before and after each experimental campaign, and results compared to detect potential problem caused by the testing. Results of the diagnostics may be stored in a report provided at the end of the test, together with the outcome of the experimental campaign (e.g., pass/fail) which may be classified using one or more of the following criteria: (1) 100% test completed (time or request completed), (2) throughput (e.g., serving 99% of the requests 95% of the time, (3) no defects/outages/crashes/exceptions encountered, (4) all controllers and network devices working and available, (5) all software components active at the start and at the end of the test, (6) latency (e.g., 95% of average latency measured during the warm-up phase, (7) no error present in the logs, (8), no recovery triggered, or (9) all of the requests submitted in input eventually processed. It will be appreciated that less or more, as well as different, criteria may be used to characterize the outcome of the experimental campaign.

It will be appreciated that the in-production performance testing system architecture 100 may be configured to support various other functions, may include various other combinations of components configured to provide functions, may be implemented in various other ways, or the like, as well as various combinations thereof.

Figure 4:
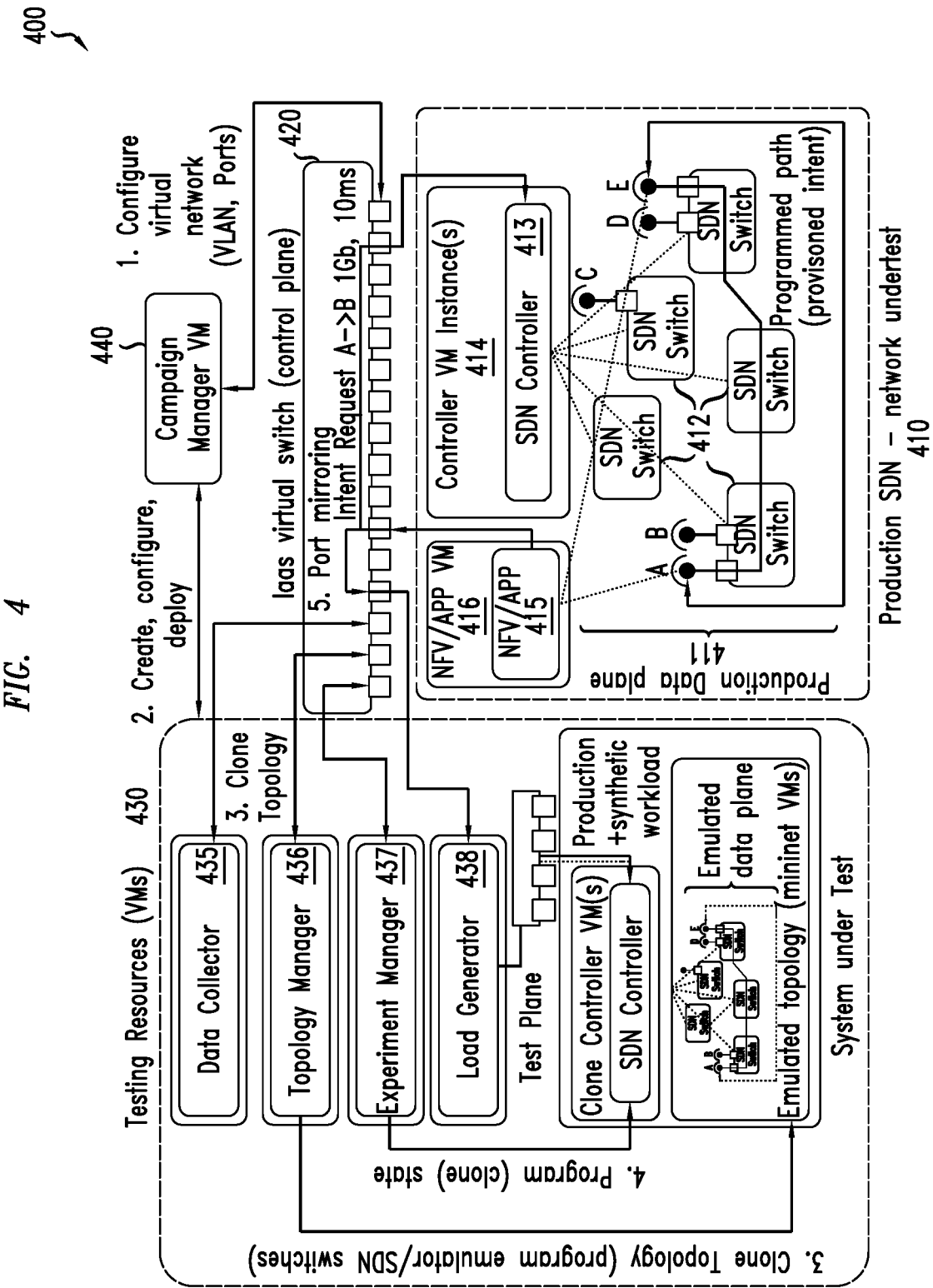
FIG. 4 depicts an example of a system for illustrating interconnection of a test plane and a production control plane for in-production performance testing for SDNs using an in-production performance testing system architecture.

FIG. 4 depicts an example of a system for illustrating interconnection of a test plane and a production control plane for in-production performance testing for SDNs using an in-production performance testing system architecture.

The system 400 includes a production SDN 410, an SDN control plane mirroring element 420, a set of testing resources 430, and a Campaign Manager 440.

The production SDN 410 include a production data plane 411 including various SDN switches 412, an SDN controller 413 which may be provided using a set of controller VM instances 414, and an NVF/APP element 415 which may be provided using an NVF/APP VM 416. The typical operation of a production SDN, such as the production SDN 410, will be understood by one skilled in the art.

The SDN control plane mirroring element 420 may be a production control plane switch or network which may be considered to be outside of the production SDN (as illustrated in FIG. 4) or which may be considered to be part of the production SDN 410 (omitted from FIG. 4 for purposes of clarity). The SDN control plane mirroring element 420 is configured to enable interconnection of the control plane of the production SDN 410 and the test plane provided by the testing resources 430. The SDN control plane mirroring element 420 is configured to support interconnection of the control plane of the production SDN 410 and the test plane provided by the testing resources 430 based on mirroring of the control plane of the production SDN 410 to the testing resources 430. The SDN control plane mirroring element 420 may be implemented as a virtual element configured to supporting control plane mirroring, such as a virtual network, a virtual switch (e.g., using an IaaS virtual switch), or the like, as well as various combinations thereof. The mirroring of the control plane of the production SDN 410 to the testing resources 430 is illustrated by the intent requests issued by the NVF/APP element 415 being provided to both the SDN controller 413 of the production SDN 410 as well as to elements of the testing resources 430, as discussed further below.

The testing resources 430 may be configured to provide a test plane for testing of the production SDN 410.

The testing resources 430 may include a System Under Test 431 (which may be similar to System Under Test 160 of FIG. 1). The System Under Test 431 includes an emulated data plane 432 and an SDN controller 433. The emulated data plane 432 provides an emulated version of the data plane of the production SDN 410 for which SDN control plane testing is being performed. The emulated data plane 432 may be provided using mininet VMs. The SDN controller 433 is a clone of the SDN controller 413 of the production SDN 410. The SDN controller 433 may be implemented using one or more clone controller VMs 434.

The testing resources 430 may include components of an in-production performance testing system architecture (such as the in-production performance testing system architecture 100 of FIG. 1). For example, the testing resources 430 may include a Data Collector 435 (which may be implemented using Data Collector 150 of FIG. 1), a Topology Manager 436 (which may be implemented using Topology Manager 140 of FIG. 1), an Experiment Manager 437 (which may be implemented using Experiment Manager 120 of FIG. 1), and a Load Generator 438 (which may be implemented using Load Generator 130 of FIG. 1). The set of testing resources 110 may be provided using a set of VMs. The testing resources 430 may be configured to provide functions for performing in-production testing of the control plane of the production SDN 410 based on interconnection of the control plane of the production SDN 410 and the test plane provided by the testing resources 430 using the SDN control plane mirroring element 420.

The Campaign Manager 440 may be configured to control various aspects of in-production performance testing of the production SDN 410 by the testing resources 430 based on interconnection of the control plane of the production SDN 410 and the test plane provided by the testing resources 430 using the SDN control plane mirroring element 420. The Campaign Manager 440 configures the SDN control plane mirroring element 420 to provide a virtual network (e.g., VLAN(s), ports, or the like, as well as various combinations thereof) for mirroring the control plane of the production SDN 410 to the testing resources 430 (illustrated as Step 1 in FIG. 4). The Campaign Manager 440 creates, configures, and deploys the testing resources 430 to provide the test plane for in-production performance testing of the production SDN 410 (illustrated as Step 2 in FIG. 4). As discussed further below, following these configuration actions performed by the Campaign Manager 440, the testing resources 430 may then operate to perform in-production performance testing of the production SDN 410 by the testing resources 430 based on interconnection of the control plane of the production SDN 410 and the test plane provided by the testing resources 430 using the SDN control plane mirroring element 420.

The Topology Manager 436 is configured to provide various functions in support of in-production performance testing of the production SDN 410.

The Topology Manager 436 may be composed of a set of bash and python scripts controlled through a Java REST application to set up the data plane topology used in the testing. The Topology Manager 436 may incorporate the Mininet tool to reproduce different types of emulated data planes. The Topology Manager 436 may also program real SDN switches to be used in the testing tasks, by interacting with the standard OpenFlow management API (such as the OpenFlow Switch Management API).

The Topology Manager 436 may operate in two modes: (1) production mode, to run tests using a virtualized clone of the production data plane SDN topology and (2) synthetic mode, to run tests with a pre-defined topology (e.g., in-line) set by the user. An example of an algorithm for use by the Topology Manager 436 to operate in the production mode over an emulated topology is presented in FIG. 5. The algorithm 500 of FIG. 5 may be used by the Topology Manager 436 to generate a clone of the real topology (illustrated as Step 3 of FIG. 4) from the production topology. The operations may start after the Campaign Manager 440 creates the testing resources 430 (i.e., the Data Collector 435, the Topology Manager 436, the Experiment Manager 437, and the Load Generator 438 as illustrated in Step 2 of FIG. 4). After the deployment of the testing resources 430, the Topology Manager 436 collects the details of the production data plane topology, including host IP and mac addresses, IP of the SDN controllers, SDN switches, and physical links between switches (lines 1-4 of algorithm 500), by querying the production SDN controller. Next, the Topology Manager 436 invokes the Campaign Manager 440 to create the VMs for hosting the SDN controller instances (line 5 of algorithm 500). It is noted that, in doing this, the Campaign Manager 440 can alter the SDN controller instances VMs in terms of number of CPUs, amount of RAM, as number of controller in the clusters, depending on the parameters specified by the experimental campaign specification. After this step, the Topology Manager 436 generates the emulated topology (line 6 of algorithm 500) that reflects the production topology with (1) same number of switches, (2) same links between switches, keeping same capacity and latency figures, (3) same number of hosts, keeping ports, mac, and IPs as the production topology. Finally, the switches of the generated topology are programmed with the IPs of the controller instance VMs generated by the Campaign Manager (line 7 of algorithm 500). Finally, the Topology Manager 436 invokes the Load Generator 438 to initialize the topology by provisioning the intents installed in the production topology (line 8 of algorithm 500).

It is noted that, although an algorithm for use by the Topology Manager 436 to operate in the synthetic mode is not presented, the synthetic mode reduces to generating the topology following a pre-defined mininet topology script provided in the experimental campaign specification provided to the Campaign Manager 440.

The Topology Manager 436 may be configured to provide various other functions in support of in-production performance testing of the production SDN 410.

The Load Generator 438 is configured to provide various functions in support of in-production performance testing of the production SDN 410.

The Load Generator 438 may be configured to provide workload to the System Under Test 431. The workload may include production workload mirrored to the Load Generator 438 by the SDN control plane mirroring element 420 (which may be denoted herein as "Production Mode"). The workload may include synthetic workload generated by the Load Generator 438 (which may be denoted herein as "Synthetic Mode"). The workload may include a combination of production workload and synthetic workload (which may be referred to herein "Hybrid Mode").

The Load Generator 438 may be configured to reproduce realistic workload conditions for the System Under Test 431. The workload may be in the form of specific control-plane requests for the System Under Test 431. The control plane requests for the System Under Test 431 may be in the form of (1) intent install to set up new connections and (2) intent withdraw to cancel a connection previously successfully provisioned. For example, intent install requests may include requests for bidirectional connections between pairs of hosts in the data plane or other types of requests. It is noted that both request types (namely, intent install and intent withdraw) can work in Production Mode (requests are coming from the production SDN 410), Synthetic Mode (requests are generated by the Load Generator 438), and Hybrid Mode (in which the System Under Test 431 is exercised with requests coming from the production SDN 410 and with synthetic requests at the same time). It is noted that the Hybrid Mode may be used to test specific types of conditions (e.g., surge of requests, network overload conditions, or the like, as well as various combinations thereof) It is noted that, in any of the operational modes, data-plane traffic may be emulated for each created intent using different profiles, including burst, mice and elephant flows implemented with iperf36.

The Load Generator 438 may be configured to reproduce realistic workload conditions for the System Under Test 431 in the form of requests which, as discussed above, may include install intents and withdraw intents. The Load Generator 438 may provide the requests to the System Under Test 431 by providing the requests to the SDN controller 433 of the System Under Test 431 such that the SDN controller 433 may configure the SDN data plane 432 of the System Under Test 431 based on the requests from the Load Generator 438. The Load Generator 438 may provide the requests to the SDN controller 433 of the System Under Test 431 in various ways. The Load Generator 438 may provide the requests to the SDN controller 433 of the System Under Test 431 in batch units. The Load Generator 438 may provide the requests to the SDN controller 433 of the System Under Test 431 using a load balancing algorithm or policy. For example, the load balancing algorithm or policy may be round robin, weighted round robin, or the like. For example, for weighted round robin, each server hosting an SDN controller instance may be weighted according to its response time (e.g., lower weights are assigned for longer response times with a capability to select an SDN controller instance according to the weights). The load balancing algorithm or policy that is used may be specified in the experimental campaign specification that is received and processed by the Campaign Manager 440. The Load Generator 438 may provide the requests to the SDN controller 433 of the System Under Test 431 using a set of TCP connections managed by the Load Generator 438 (e.g., an overall pool of TCP connections for the set of SDN controller instances of the SDN controller 433 or respective pools of TCP connections for the respective SDN controller instances of the SDN controller 433), thereby reducing internal overhead based on reuse of the TCP connections.

The Load Generator 438 may be configured to operate in the Production Mode, in which production workload mirrored to the Load Generator 438 by the SDN control plane mirroring element 420 is provided by the Load Generator 438 to the SDN controller 433 of the System Under Test 431. The Load Generator 438 may be considered to act as a proxy for the production requests (e.g., network intent installations and withdraws) that are mirrored from the production SDN 410 using the SDN control plane mirroring element 420. An example of an algorithm for use by the Load Generator 438 to operate in the Production Mode is presented in FIG. 6. The algorithm 600 of FIG. 6 may be used by the Load Generator 438 to provide production workload from the production SDN 410 to the System Under Test 431 (as illustrated in FIG. 4). It is noted that, consistent with real non-federated deployments, it may be assumed that the production SDN controller instances of the network under test (e.g., controller VM instances 414) belongs to the same subnet/VLAN group and are connected to a single distributed virtual switch in the cloud infrastructure (e.g., the SDN control plane mirroring element 420). The Load Generator 438 may perform some initialization functions (lines 1-3 of algorithm 600). The Load Generator 438 connects to the SDN control plane mirroring element 420 (e.g., to a port of the SDN control plane mirroring element 420) (line 4 of algorithm 600). The Load Generator 438 sets the port of the SDN control plane mirroring element 420 to tag the mirrored traffic with a different VLAN (line 5 of algorithm 600), thereby supporting separation of the test network (illustratively, System Under Test 431) from the production network (illustratively, production SDN 410). The Load Generator 438, for each of the production SDN controllers (illustratively, controller VM instances 414) in the production SDN 410, creates a respective virtual network card and connects the virtual network card to the SDN control plane mirroring element 420 (e.g., to a port of the SDN control plane mirroring element 420) using (1) the same IP(s) as in the production SDN controllers (illustratively, controller VM instances 414) and (2) a different VLAN (e.g., TestVLAN) (lines 7-10 of algorithm 600). The Load Generator 438 creates a new switch (denoted as testing control plane switch 439) to form the control plane of the testing resources (line 9 of algorithm 600). The Load Generator 438, for each of the virtual machines in the testing resources 430, creates a new virtual network interface card (line 12 of algorithm 600) and connects the new virtual network interface card to the testing control plane switch 439 (line 13 of algorithm 600). The Load Generator 438 sends a request to the Campaign Manager 440 for the Campaign Manager 440 to mirror all the ports of all the virtual machines of the network under test (line 17 of algorithm 600). The Load Generator 438 sends a request to the Experiment Manager 437 for the Experiment Manager 437 to configure the SDN controllers to test (line 19 of algorithm 600).

It is noted that the port mirroring happens on the control plane switch (namely, SDN control plane mirroring element 420) and targets the production control plane traffic of the production SDN 410 such that it is copied one-way over a different VLAN (denoted as TestVLAN). This isolates the traffic across the test and production environments, thereby allowing the Load Generator to be configured with the same IP(s) used for the production SDN controllers (namely, the controller VM instances 414). As a result, the Load Generator 438 is able to (1) receive the same requests addressed to the SDN controller 413 of the production SDN 410, (2) overlap the production traffic with synthetic requests to alter the traffic rates and generate different test cases/scenarios, (3) perform the balancing of requests across the clone controller VMs 434 providing the SDN controller 433 of the System Under Test 431, and (4) maintain isolation between the System Under Test 431 and the SDN controller 413 of the production SDN 410.

The Load Generator 438 may be configured to operate in the Synthetic Mode, in which the Load Generator 438 generates workload for the SDN controller 433 of the System Under Test 431 and provides the generated workload to the SDN controller 433 of the System Under Test 431. In the Synthetic Mode, each request can be created by replaying a user-provided trace workload file, by randomly selecting two edge switches (e.g., switches having at least one host connected), or the like, as well as various combinations thereof. In the case in which the Load Generator 438 randomly selects two edge switches, the Load Generator 438 may generate requests by creating intents between two randomly selected hosts in the topology. It is noted that, although it is legitimate for an intent to involve hosts connected to the same switch, the Load Generator 438 may create requests involving only hosts connected to different switches, in order to actually trigger the creation of a network path. It is noted that randomly generated intent requests may include constant bandwidth and latency values, whereas user-provided trace files can include any value for bandwidth and latency requests. The Load Generator 438 may be configured to generate synthetic requests according to various profiles or modes, discussed further below.

The Load Generator 438 may be configured to generate synthetic requests according to an impulse response mode. In the impulse response mode, the Load Generator 438 may be configured to submit a set of S max subsequent impulses of requests. In the impulse response mode, each impulse may include two batches of Rx install and withdraw requests, respectively. The Load Generator 438 first submits the batch of install requests, waiting until the process terminates. The waiting cycle ends when: IntentThroughput+IntentFailureRate=Rx, with IntentThroughput being the rate of requests correctly handled by the SDN controller 433 of the System Under Test 431, and IntentFailureRate the rate of the failed requests. Then, the Load Generator 438 submits the batch of withdraw requests and, as with the batch of install requests, waits for the withdrawal phase to terminate. The Load Generator 438 may then pause for a time interval T before starting a new impulse of requests.

The Load Generator 438 may be configured to generate synthetic requests according to a steady state response mode. In the steady state response mode, the Load Generator 438 may constantly generate and submit a batch of Rx requests per unit time. In the steady state response mode, each batch may include both types of requests (namely, intent install and withdraw requests). The Load Generator 438, regardless of the type of submitted requests, ensures that only Rx requests will be submitted per unit time. The Load Generator 438 may be configured to use a token bucket to control the load, generating new requests only if the token bucket is non-empty.

The Load Generator 438 may be configured to generate synthetic requests according to a probabilistic mode. In the probabilistic mode, the Load Generator 438 may be configured such that intents are installed and withdrawn according to an Install Request Rate and a Withdraw Request, respectively. The Load Generator 438 may choose the rates following specific probability distributions that can be specified in the experimental campaign specification provided by the Campaign Manager 440.

The Load Generator 438 may be configured to operate in the Hybrid Mode, in which the Load Generator provides a combination of production workload and synthetic workload to the SDN controller 433 of the System Under Test 431.

The Load Generator 438 may be implemented in various ways. The Load Generator 438 may be implemented using a set of one or more VMs. The Load Generator 438 may be defined as an extensible Java-based application. The Load Generator 438 may be implemented in various other ways.

The Load Generator 438 may be configured to provide various other functions in support of in-production performance testing of the production SDN 410.

It will be appreciated that various elements of the system 400 (e.g., the production SDN 410, the SDN control plane mirroring element 420, the set of testing resources 430, and the Campaign Manager 440) may be configured to provide various other functions supporting in-production performance testing of SDNs.

FIG. 7 depicts an example of a method for use by a Topology Manager of the in-production performance testing system architecture to provide an emulated version of a production SDN that includes an SDN data plane and an SDN control plane. It will be appreciated that, although primarily presented herein as being performed serially, at least a portion of the functions of method 700 may be performed contemporaneously or in a different order than as presented in FIG. 7. At block 701, method 700 begins. At block 710, receive, based on querying of the SDN control plane, a description of a topology of the SDN data plane. At block 720, configure, based on the description of the topology of the SDN data plane, a cloned SDN data plane configured to emulate the SDN data plane. At block 799, method 700 ends.

Figure 8:
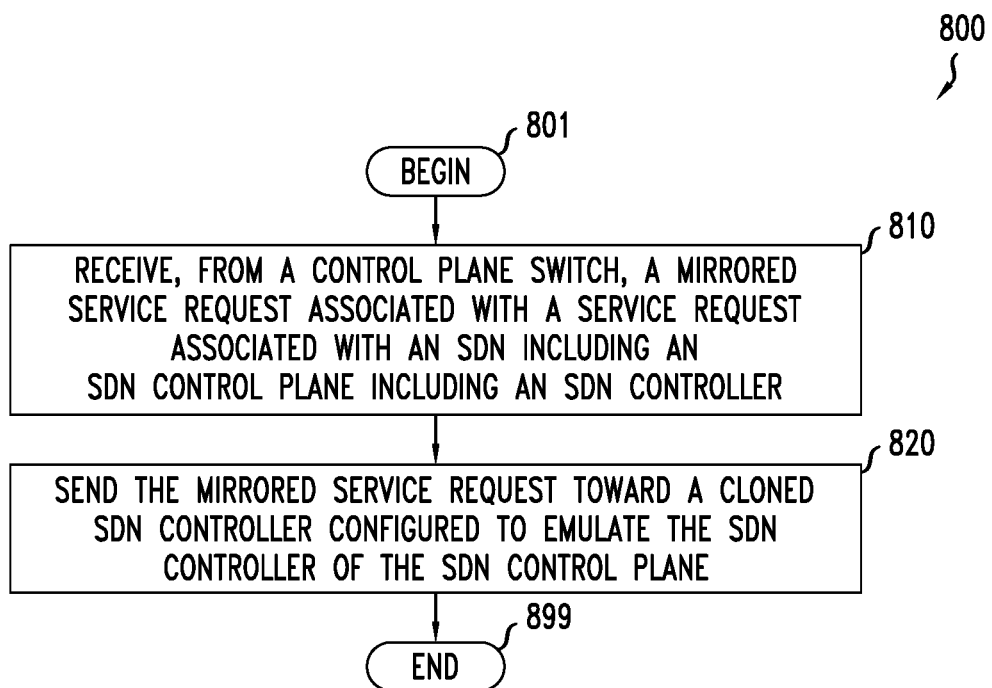
FIG. 8 depicts an example of a method for use by a Load Generator of the in-production performance testing system architecture to apply load to an emulated version of a production SDN.

FIG. 8 depicts an example of a method for use by a Load Generator of the in-production performance testing system architecture to apply load to an emulated version of a production SDN that includes an SDN data plane and an SDN control plane. It will be appreciated that, although primarily presented herein as being performed serially, at least a portion of the functions of method 800 may be performed contemporaneously or in a different order than as presented in FIG. 8. At block 801, method 800 begins. At block 810, receive, from a control plane switch, a mirrored service request associated with a service request associated with the SDN. At block 820, send the mirrored service request toward a cloned SDN controller configured to emulate an SDN controller of the SDN control plane. At block 899, method 800 ends.

Figure 9:
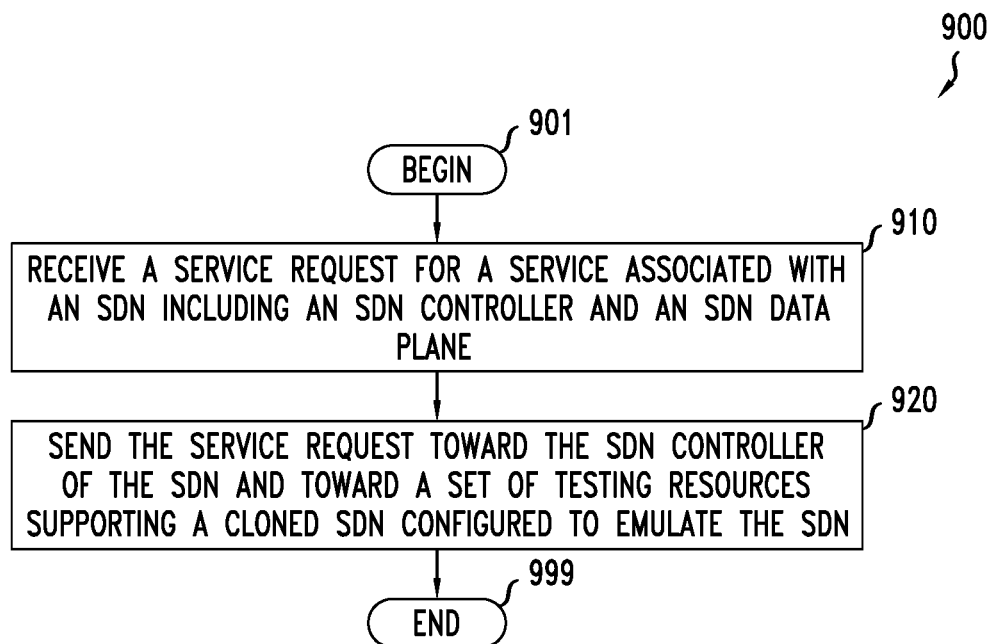
FIG. 9 depicts an example of a method for use by an SDN control plane mirroring element to mirror requests of a production SDN.

FIG. 9 depicts an example of a method for use by an SDN control plane mirroring element to mirror service requests of a production SDN. It will be appreciated that, although primarily presented herein as being performed serially, at least a portion of the functions of method 900 may be performed contemporaneously or in a different order than as presented in FIG. 9. At block 901, method 900 begins. At block 910, receive a service request for a service associated with an SDN including an SDN controller and an SDN data plane. At block 920, send the service request toward the SDN controller of the SDN and toward a set of testing resources supporting a cloned SDN configured to emulate the SDN. At block 999, method 900 ends.

Various embodiments of the in-production testing capability may provide various advantages or potential advantages. In at least some embodiments, for example, the in-production testing capability enables in-production performance testing for operator SDNs using a testing platform that supports a level of automation similar to or even achieving that available in deployment of cloud services. In at least some embodiments, for example, the in-production testing capability enables performance testing that focuses on analysis of design choices in the cloud and SDN control planes influence SLA metrics like service installation throughput and latency. Various embodiments of the in-production testing capability may provide various other advantages or potential advantages.

Figure 10:
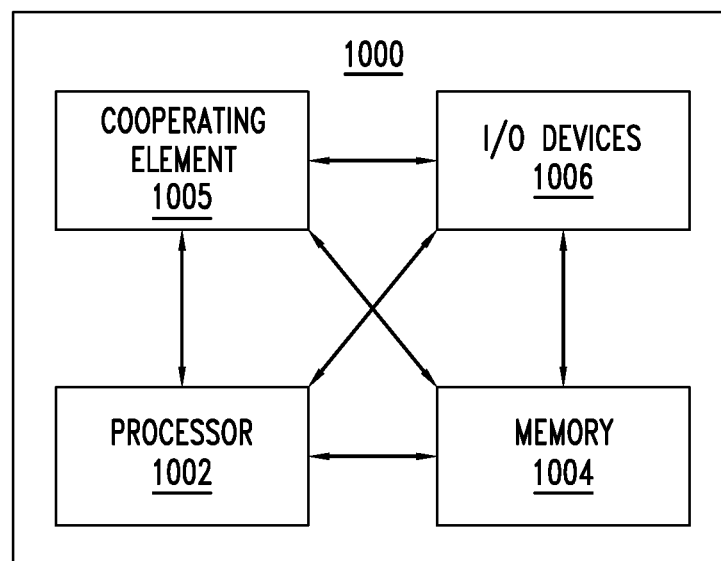
FIG. 10 depicts a high-level block diagram of a computer suitable for use in performing various functions presented herein.

FIG. 10 depicts a high-level block diagram of a computer suitable for use in performing various functions described herein.

The computer 1000 includes a processor 1002 (e.g., a central processing unit (CPU), a processor having a set of one or more processor cores, or the like) and a memory 1004 (e.g., a random access memory (RAM), a read only memory (ROM), or the like). The processor 1002 and the memory 1004 are communicatively connected to each other as well as various other elements.

The computer 1000 also may include a cooperating element 1005. The cooperating element 1005 may be a hardware device. The cooperating element 1005 may be a process that can be loaded into the memory 1004 and executed by the processor 1002 to implement functions as discussed herein (in which case, for example, the cooperating element 1005 (including associated data structures) can be stored on a non-transitory computer-readable storage medium, such as a storage device or other storage element (e.g., a magnetic drive, an optical drive, or the like)).

The computer 1000 also may include one or more input/output devices 1006. The input/output devices 1006 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices or elements (e.g., a tape drive, a floppy drive, a hard disk drive, a compact disk drive, or the like), or the like, as well as various combinations thereof.

It will be appreciated that computer 1000 of FIG. 10 may represent a general architecture and functionality suitable for implementing functional elements described herein, portions of functional elements described herein, or the like, as well as various combinations thereof. For example, computer 1000 may provide a general architecture and functionality that is suitable for implementing various elements presented herein.

It will be appreciated that the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory including a set of instructions;
wherein the set of instructions is configured to, when executed by the at least one processor, cause the apparatus to at least:
receive, based on querying of a software defined network (SDN) control plane, a description of a topology of an SDN data plane; and
configure, based on the description of the topology of the SDN data plane, a cloned SDN data plane configured to emulate the SDN data plane.

2. The apparatus of claim 1, wherein the description of the topology of the SDN data plane comprises a description of a set of hosts of the SDN data plane, a description of a set of SDN switches of the SDN data plane, and a description of a set of links of the SDN data plane.

3. The apparatus of claim 1, wherein the description of the topology of the SDN data plane is received via a control plane switch configured to support port mirroring for a set of ports communicatively connected to the SDN control plane.

4. The apparatus of claim 1, wherein the description of the topology of the SDN data plane comprises an address of a SDN controller of the SDN control plane, wherein, to configure the cloned SDN data plane, the set of instructions is configured to, when executed by the at least one processor, cause the apparatus to at least:
    request creation of a virtual resource configured to host a cloned SDN control plane configured to emulate the SDN control plane; and
    configure a set of cloned SDN switches of the cloned SDN data plane with an address of the virtual resource configured to host the cloned SDN control plane configured to emulate the SDN control plane.

5. The apparatus of claim 1, wherein the set of instructions is configured to, when executed by the at least one processor, cause the apparatus to at least:
    receive control plane state information of an SDN controller of the SDN control plane; and
    configure, based on the control plane state information of the SDN controller of the SDN control plane, a cloned SDN controller configured to emulate the SDN controller of the SDN control plane.

6. The apparatus of claim 5, wherein the control plane state information of the SDN controller of the SDN control plane is received via a control plane switch configured to support port mirroring for a set of ports communicatively connected to the SDN control plane.

7. The apparatus of claim 5, wherein the set of instructions is configured to, when executed by the at least one processor, cause the apparatus to at least:
    receive a mirrored service request comprising a mirrored version of a request for a service issued for the SDN; and
    send the mirrored service request to the cloned SDN controller.

8. An apparatus, comprising:
    at least one processor; and
    at least one memory including a set of instructions;
    wherein the set of instructions is configured to, when executed by the at least one processor, cause the apparatus to at least:
        receive, from a control plane switch, a mirrored service request associated with a service request associated with a software defined network (SDN); and
        send the mirrored service request toward a cloned SDN controller configured to emulate an SDN controller of an SDN control plane of the SDN.

9. The apparatus of claim 8, wherein the set of instructions is configured to, when executed by the at least one processor, cause the apparatus to at least:
    set a port of the control plane switch to tag traffic from the SDN control plane with a virtual local area network (VLAN) identifier different than a VLAN identifier used in the SDN.

10. The apparatus of claim 8, wherein the set of instructions is configured to, when executed by the at least one processor, cause the apparatus to at least:
    provide a set of virtual network cards corresponding to a set of SDN controller instances providing the SDN controller of the SDN control plane.

11. The apparatus of claim 10, wherein the virtual network cards have Internet Protocol (IP) addresses matching respective IP addresses of the respective SDN controller instances and a virtual local area network (VLAN) identifier different than a VLAN identifier associated with the SDN controller instances.

12. The apparatus of claim 10, wherein the set of instructions is configured to, when executed by the at least one processor, cause the apparatus to at least:
    connect, to the control plane switch, the set of virtual network cards corresponding to the set of SDN controller instances providing the SDN controller of the SDN control plane.

13. The apparatus of claim 8, wherein the set of instructions is configured to, when executed by the at least one processor, cause the apparatus to at least:
    provide a second control plane switch configured to support sending of the mirrored service request toward the cloned SDN controller configured to emulate the SDN controller of the SDN control plane.

14. The apparatus of claim 8, wherein the set of instructions is configured to, when executed by the at least one processor, cause the apparatus to at least:
    receive, based on querying of the SDN control plane, a description of a topology of the SDN data plane; and
    configure, based on the description of the topology of the SDN data plane, a cloned SDN data plane configured to emulate the SDN data plane.

15. The apparatus of claim 14, wherein the description of the topology of the SDN data plane is received via the control plane switch.

16. The apparatus of claim 8, wherein the set of instructions is configured to, when executed by the at least one processor, cause the apparatus to at least:
    receive control plane state information of the SDN controller of the SDN control plane; and
    configure, based on the control plane state information of the SDN controller of the SDN control plane, the cloned SDN controller configured to emulate the SDN controller of the SDN control plane.

17. The apparatus of claim 16, wherein the control plane state information of the SDN controller of the SDN control plane is received via the control plane switch.

18. The apparatus of claim 8, wherein the set of instructions is configured to, when executed by the at least one processor, cause the apparatus to at least:
    generate, based on a description of an operation to be performed, a synthetic service request; and
    send the synthetic service request toward the cloned SDN controller configured to emulate the SDN controller of the SDN control plane.

19. The apparatus of claim 18, wherein the synthetic service request is sent based on at least one of a steady-state response mode, an impulse response mode, or a probabilistic response mode.

20. An apparatus, comprising:
    at least one processor; and
    at least one memory including a set of instructions;
    wherein the set of instructions is configured to, when executed by the at least one processor, cause the apparatus to at least:
        receive a service request for a service associated with a software defined network (SDN) including an SDN controller and an SDN data plane; and
        send the service request toward the SDN controller of the SDN and toward a set of resources supporting a cloned SDN configured to emulate the SDN.

\* \* \* \* \*